(12) United States Patent
Bogdanov et al.

(10) Patent No.: US 12,227,129 B2
(45) Date of Patent: Feb. 18, 2025

(54) ILLUMINATED TRIM COMPONENT AND METHOD OF MAKING

(71) Applicant: INTEVA PRODUCTS, LLC, Troy, MI (US)

(72) Inventors: Natalie Bogdanov, Langenfeld (DE); Andreas Rahn, Radevormwald (DE); Stefan Wiepen, Schwerte (DE); Niklas Kock, Sprockhövel (DE); Aidano Nascimento, Oakland, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 18/236,068

(22) Filed: Aug. 21, 2023

(65) Prior Publication Data

US 2024/0059216 A1    Feb. 22, 2024

Related U.S. Application Data

(60) Provisional application No. 63/399,486, filed on Aug. 19, 2022.

(51) Int. Cl.
| | | |
|---|---|---|
| *B60Q 3/00* | (2017.01) | |
| *B60Q 3/54* | (2017.01) | |
| *B60Q 3/82* | (2017.01) | |
| *F21K 9/66* | (2016.01) | |
| *F21V 29/90* | (2015.01) | |
| *F21W 106/00* | (2018.01) | |
| *F21Y 115/10* | (2016.01) | |

(52) U.S. Cl.
CPC ................ *B60Q 3/54* (2017.02); *B60Q 3/82* (2017.02); *F21K 9/66* (2016.08); *F21V 29/90* (2015.01); *F21W 2106/00* (2018.01); *F21Y 2115/10* (2016.08)

(58) Field of Classification Search
CPC .. B60Q 3/54; B60Q 3/82; F21V 29/90; F21K 9/66
See application file for complete search history.

(56) References Cited

U.S. PATENT DOCUMENTS

| | | | |
|---|---|---|---|
| 8,414,069 B1* | 4/2013 | Contardi .............. | B60Q 1/0433 293/120 |
| 2009/0056183 A1* | 3/2009 | Reiland ................. | G02B 6/006 40/564 |

(Continued)

OTHER PUBLICATIONS

German Office Action corresponding to DE Application No. 20 2023 104 723.8; Issue Date, Nov. 13, 2023.

*Primary Examiner* — Gerald J Sufleta, II (74) *Attorney, Agent, or Firm* — CANTOR COLBURN LLP (57) ABSTRACT

A trim element, including: a flexible layer; a carrier, the flexible layer being secured to the carrier, the flexible layer comprising an outer show surface layer, a translucent layer and a light source, the light source being secured to a side of the translucent layer that is opposite to a side of the translucent layer secured to the outer show surface layer, the outer show surface layer being translucent; and a masking layer located between the outer show surface layer and the translucent layer, the masking layer having gaps where no masking layer is located between the outer show surface layer and the translucent layer.

20 Claims, 5 Drawing Sheets

(56) References Cited

U.S. PATENT DOCUMENTS

2012/0200475 A1\* 8/2012 Baker ................... G09F 13/04
 345/4
2019/0126853 A1\* 5/2019 Cannon ................. B60Q 3/74
2020/0284974 A1\* 9/2020 Ker?nen ............. G02B 6/0051
2022/0024378 A1\* 1/2022 Yang ..................... B32B 3/08

\* cited by examiner

ILLUMINATED TRIM COMPONENT AND METHOD OF MAKING

CROSS REFERENCE TO RELATED APPLICATIONS

This application claims the benefit of U.S. Provisional Patent Application Ser. No. 63/399,486 filed on Aug. 19, 2022.

TECHNICAL FIELD

Exemplary embodiments of the present disclosure pertain to illuminated trim components.

BACKGROUND

In order to sense through a soft surface such as one that has a substrate, foam, and a skin material, the sensor is typically located on the rear of the substrate and has to sense through the complete stack up of materials. This can cause several problems. The sensitivity of such an arrangement can be reduced because of the fundamental way a capacitive sensor works. For the same reason, the signal to noise ratio can be lower making it more difficult to interpret the interaction of the operator with the sensing element. These conditions affect how close together sensor elements (and icons) can be placed.

Accordingly, it is desirable to provide an improved illuminated trim component.

BRIEF SUMMARY

The disclosure of the present application seeks to address the shortcomings of these systems by moving the sensing and lighting elements as close to the first surface of the part as possible, thus removing many layers from the sensing and lighting path. The construction of the disclosed embodiments uses materials that are themselves soft, and in combination with foam that is now behind the elements, provide the ultimate in softness. The sensitivity of the disclosed embodiments is the best possible and the signal to noise ratio is also the best possible with this arrangement. With the greatly reduced light path of this invention, light transmission losses are the minimum possible and the same is true for color shift. Embodiments disclosed herein actively addresses light bleed by incorporating blackout features between icons/symbols.

Disclosed is a trim element, including: a flexible layer; a carrier, the flexible layer being secured to the carrier, the flexible layer comprising an outer show surface layer, a translucent layer and a light source, the light source being secured to a side of the translucent layer that is opposite to a side of the translucent layer secured to the outer show surface layer, the outer show surface layer being translucent; and a masking layer located between the outer show surface layer and the translucent layer, the masking layer having gaps where no masking layer is located between the outer show surface layer and the translucent layer.

In addition to one or more of the features described above, or as an alternative to any of the foregoing embodiments, further including printed electronics for heating the outer show surface layer, the printed electronics being located between the masking layer and the translucent layer.

In addition to one or more of the features described above, or as an alternative to any of the foregoing embodiments, the printed electronics for heating the outer show surface layer are located behind or on top of the masking layer and are not located in the gaps.

In addition to one or more of the features described above, or as an alternative to any of the foregoing embodiments, further including switches for controlling the printed electronics for heating the outer show surface layer, the switches being located between the masking layer and the translucent layer and wherein the switches are located behind or on top of the masking layer and are not located in the gaps.

In addition to one or more of the features described above, or as an alternative to any of the foregoing embodiments, the switches are capacitive sensor elements.

In addition to one or more of the features described above, or as an alternative to any of the foregoing embodiments, further including switches, the switches being located between the masking layer and the translucent layer and wherein the switches are located behind or on top of the masking layer and are not located in the gaps.

In addition to one or more of the features described above, or as an alternative to any of the foregoing embodiments, the switches are capacitive sensor elements.

In addition to one or more of the features described above, or as an alternative to any of the foregoing embodiments, the light source is a plurality of light emitting diodes (LEDs).

In addition to one or more of the features described above, or as an alternative to any of the foregoing embodiments, the translucent layer is a translucent foam.

In addition to one or more of the features described above, or as an alternative to any of the foregoing embodiments, the outer show surface layer is a skin formed from a thermoplastic polyolefin (TPO).

In addition to one or more of the features described above, or as an alternative to any of the foregoing embodiments, the light source is a plurality of light emitting diodes (LEDs), the translucent layer is a translucent foam, and the outer show surface layer is a skin formed from a thermoplastic polyolefin (TPO).

In addition to one or more of the features described above, or as an alternative to any of the foregoing embodiments, the light source is a plurality of light emitting diodes (LEDs), the translucent layer is a translucent foam, and the outer show surface layer is a skin formed from a thermoplastic polyolefin (TPO).

In addition to one or more of the features described above, or as an alternative to any of the foregoing embodiments, the outer show surface layer has a plurality of hidden icons that are only visible from an exterior show surface of the outer show surface layer when they are illuminated by the light source.

In addition to one or more of the features described above, or as an alternative to any of the foregoing embodiments, further including microswitches or snap dome switches secured adjacent to the light source.

In addition to one or more of the features described above, or as an alternative to any of the foregoing embodiments, traces for the light source and contact pads are printed on the carrier or applied via transfer layer.

In addition to one or more of the features described above, or as an alternative to any of the foregoing embodiments, the outer show surface layer is a translucent skin formed from one of the following: a thermoplastic polyolefin (TPO), foil, artificial leather, leather or textile.

Also disclosed is a method of forming a trim element, including: securing a flexible layer to a carrier, the flexible layer comprising an outer show surface layer, a translucent layer and a light source, the light source being secured to a side of the translucent layer that is opposite to a side of the translucent layer secured to the outer show surface layer, the outer show surface layer being translucent; and a masking layer being located between the outer show surface layer and the translucent layer, the masking layer having gaps where no masking layer is located between the outer show surface layer and the translucent layer.

In addition to one or more of the features described above, or as an alternative to any of the foregoing embodiments, further including printed electronics for heating the outer show surface layer, the printed electronics being located between the masking layer and the translucent layer.

In addition to one or more of the features described above, or as an alternative to any of the foregoing embodiments, the printed electronics for heating the outer show surface layer are located behind or on top of the masking layer and are not located in the gaps.

In addition to one or more of the features described above, or as an alternative to any of the foregoing embodiments, further including switches for controlling the printed electronics for heating the outer show surface layer, the switches being located between the masking layer and the translucent layer and wherein the switches are located behind or on top of the masking layer and are not located in the gaps.

In addition to one or more of the features described above, or as an alternative to any of the foregoing embodiments, the switches are capacitive sensor elements.

In addition to one or more of the features described above, or as an alternative to any of the foregoing embodiments, the outer show surface layer is a translucent skin formed from one of the following: a thermoplastic polyolefin (TPO), foil, artificial leather, leather or textile.

BRIEF DESCRIPTION OF THE FIGURES

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the attached FIGS.

Figure 1:
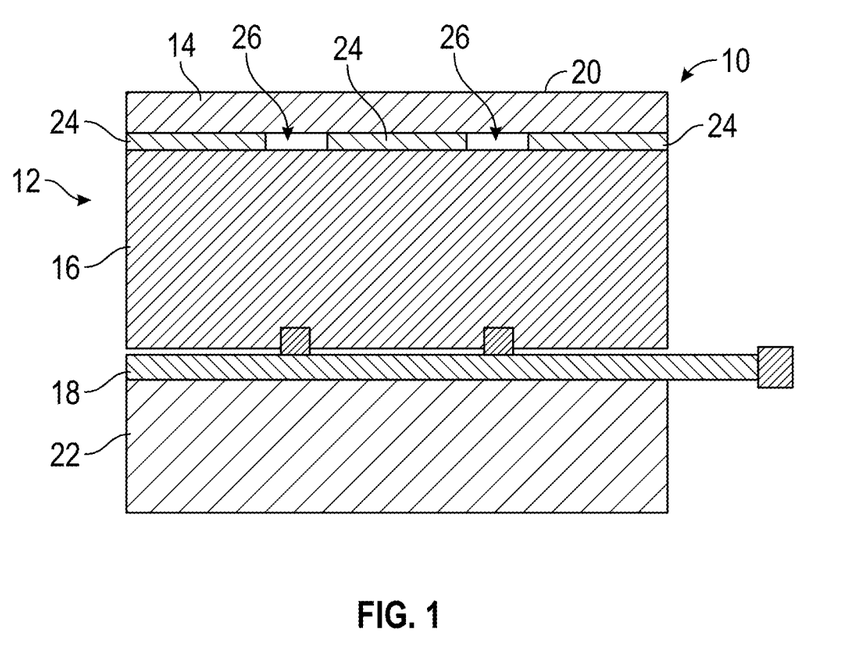
FIG. 1 is a cross-sectional view of a trim component in accordance with the present disclosure.

Referring now to FIG. 1 a perspective view of a trim component or trim element 10 with a flexible layer 12 in accordance with one non-limiting embodiment of the present disclosure is illustrated. In one non-limiting embodiment, the trim component may be an interior trim piece of a vehicle. Non-limiting examples include arm rests, center consoles, interior trim panels, portions of a dashboard as well as any other suitable portion of a vehicle.

The flexible layer 12 may include an outer show surface layer 14 and a translucent layer 16. In accordance with one non-limiting embodiment of the present disclosure the outer show surface layer 14 may be a translucent skin formed from a thermoplastic polyolefin (TPO), foil, artificial leather, leather, textile, or other equivalent material etc., with a plurality of hidden icons that are only visible from an exterior show surface 20 of the outer show surface layer 14 when they are illuminated by a light source 18 illustrated as layer 18 located behind the outer show surface layer 14. Alternatively, the icons are visible without being illuminated (e.g., printed with a visible indicia that is capable of being illuminated from its backside to make it brighter) and they are further illuminated by the light source such that they are clearly visible at night or when the area around the trim element 10 is dark.

In yet another embodiment, the outer show surface layer 14 may comprise visible icons and hidden icons, wherein the hidden icons are only visible from an exterior show surface 20 of the outer show surface layer 14 when they are illuminated by the light source located behind the outer show surface layer 14 and the visible icons may be illuminated by the light source located behind the outer show surface layer 14 or alternatively, the visible icons are not illuminated by the light source located behind the outer show surface layer 14.

It is also, understood that materials other than a thermoplastic polyolefin (TPO) can be used for the outer show surface layer 14 (e.g., leather, urethane, thermoplastic polyurethane (TPU) or any other suitable material).

The translucent layer 16 may comprise a foam or spacer located between the light source 18 and the outer show surface layer 14. In one embodiment, the light source 18 may comprise a plurality of light emitting diodes (LEDs) including with a printed electronics layer. The light source 18 being secured to a side of the translucent layer 16 that is opposite to the side of the translucent layer 16 secured to the outer show surface layer 14.

Also shown is that the light source 18 is secured to a carrier layer 22 which can be translucent or opaque. In one non-limiting embodiment, the light source 18 is a separate layer secured to the carrier layer 22. Alternatively, the light source 18 may be printed on the carrier layer 22 or be applied via a transfer foil. Located between the outer show surface layer 14 and the translucent layer 16 is a masking layer 24 in order to block the light emitted from the light source 18. For example, masking layer 24 will comprise an opaque material. A plurality of gaps 26 are provided where no masking layer 24 is applied so that the light from the light source may pass through the icons located in the outer show surface layer 14.

As such and in this embodiment, a trim element 10 with a flexible layer 12 secured to a carrier 22 is provided. The flexible layer 12 may comprise an outer show surface layer 14 and a translucent layer 16 and a light source 18 located behind the outer show surface layer 14. Also provided is a masking layer 24 located between the outer show surface layer 14 and the translucent layer 16.

Figure 2:
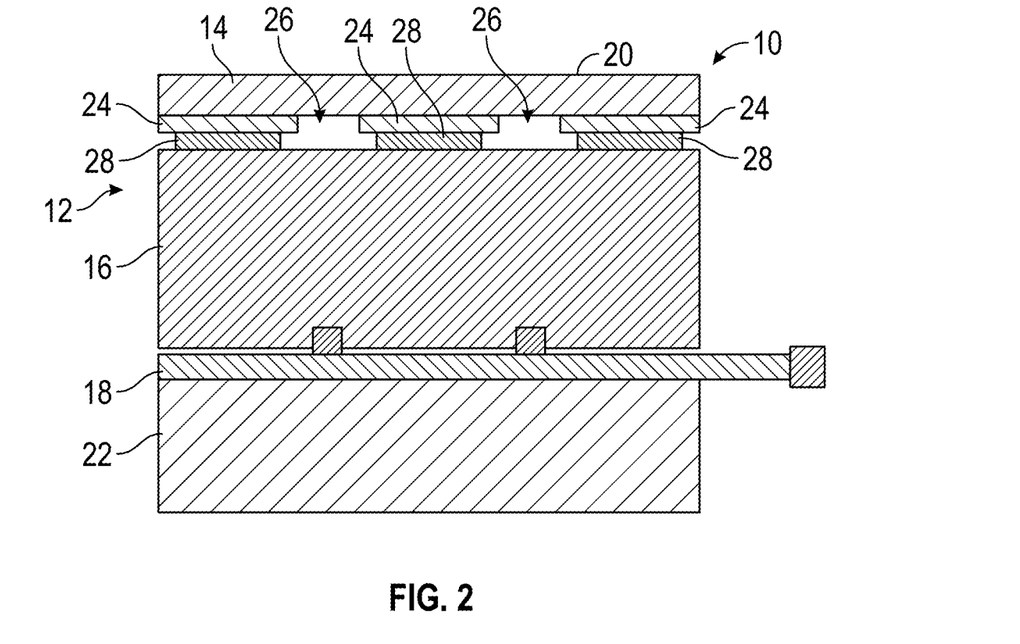
FIG. 2 is a cross-sectional view of a trim component in accordance with the present disclosure.
Figure 2A:
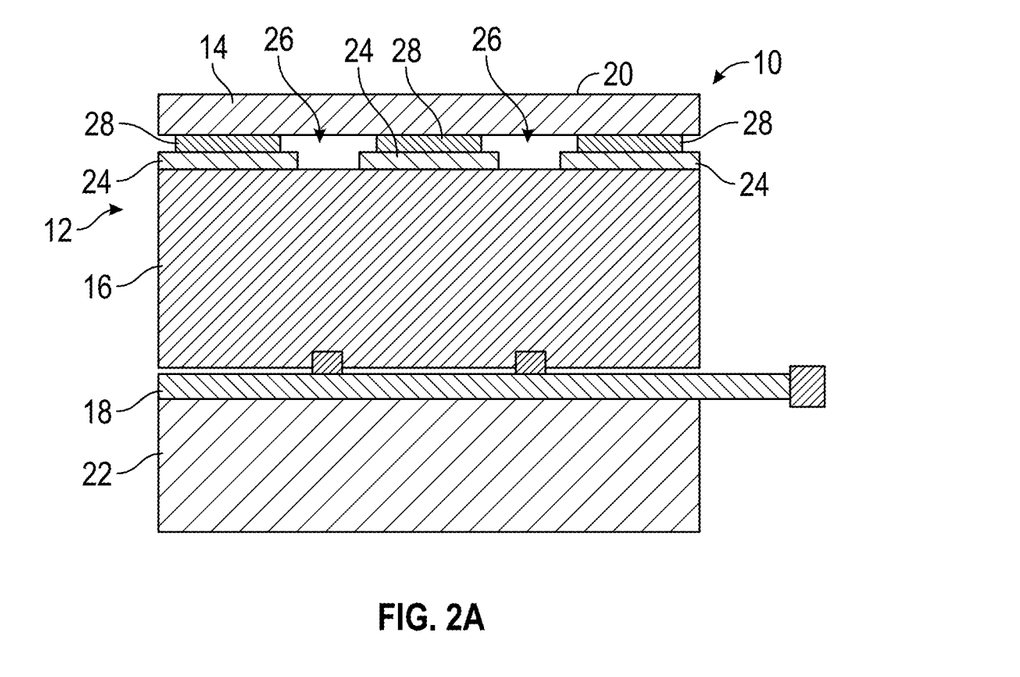
FIG. 2A is a cross-sectional view of a trim component in accordance with the present disclosure.

Referring now to FIG. 2 another embodiment of the present disclosure is provided. Here printed electronics 28 for heating the outer show surface layer 14 are located between the masking layer 24 and the translucent layer 16. As illustrated, the printed electronics 28 for heating the outer show surface layer 14 are located behind- or on top of the masking layer 24 (see FIG. 2A) and are not located in the gaps 26. As mentioned above and in one non-limiting embodiment, the light source 18 is a separate layer secured to the carrier layer 22. Alternatively, the light source 18 may be printed on the carrier layer 22 or be applied via a transfer foil.

Figure 3:
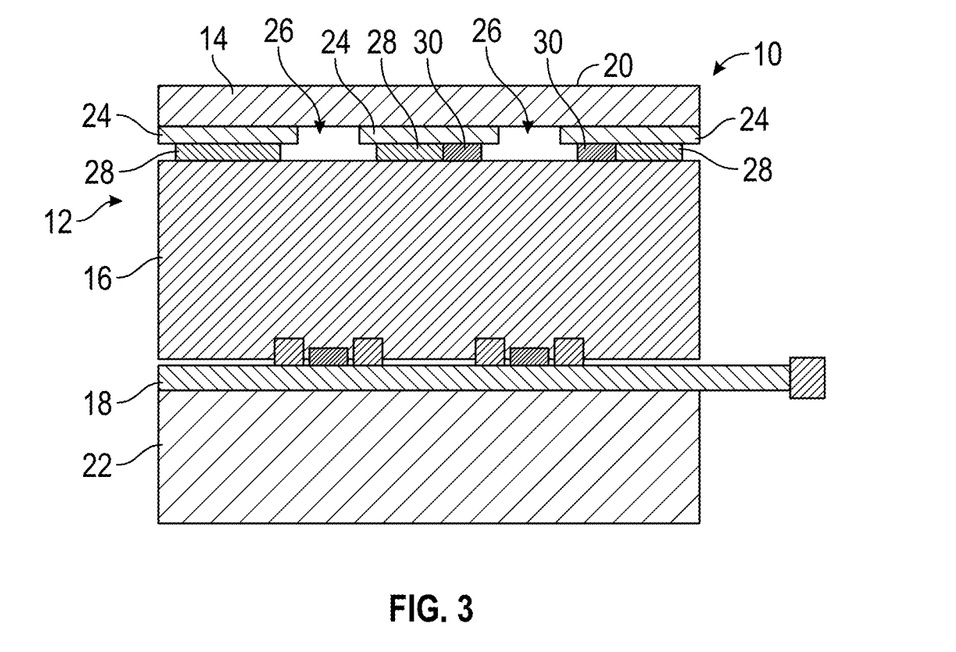
FIG. 3 is a cross-sectional view of a trim component in accordance with the present disclosure.
Figure 3A:
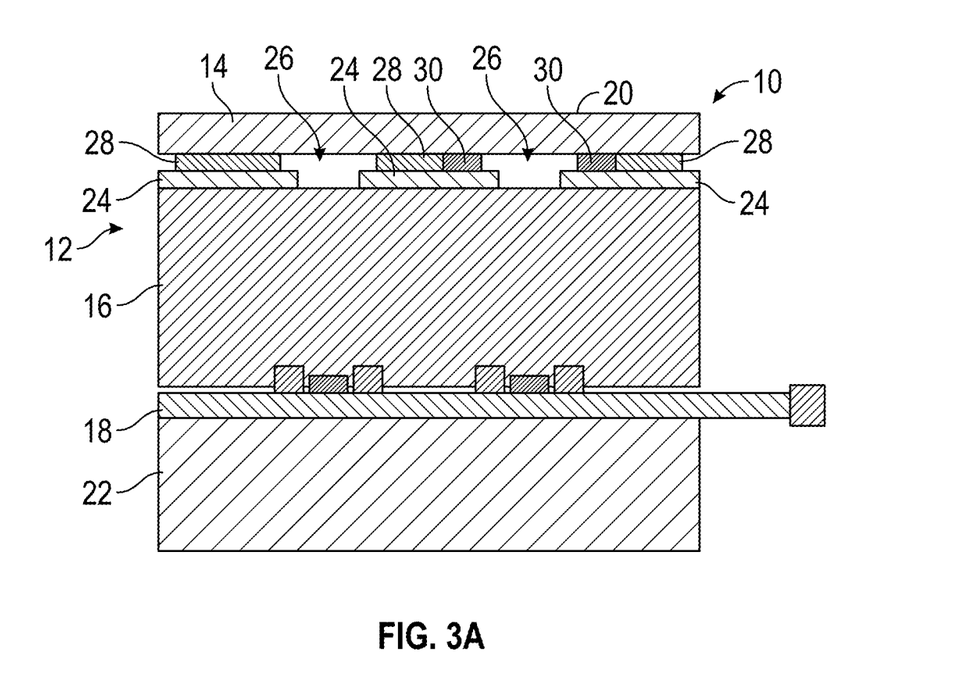
FIG. 3A is a cross-sectional view of a trim component in accordance with the present disclosure.
Figure 4:
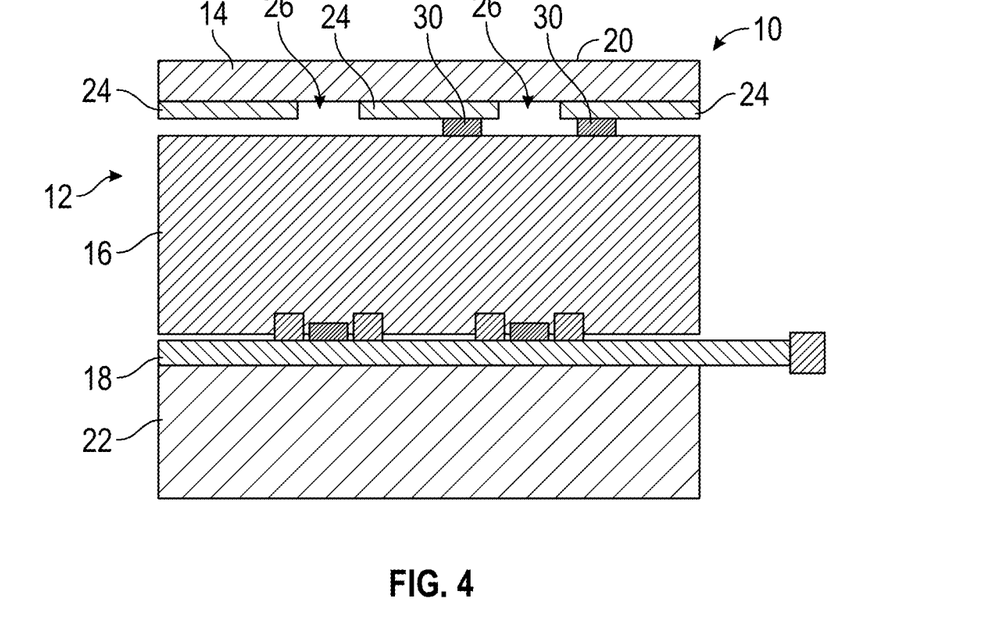
FIG. 4 is a cross-sectional view of a trim component in accordance with the present disclosure.
Figure 4A:
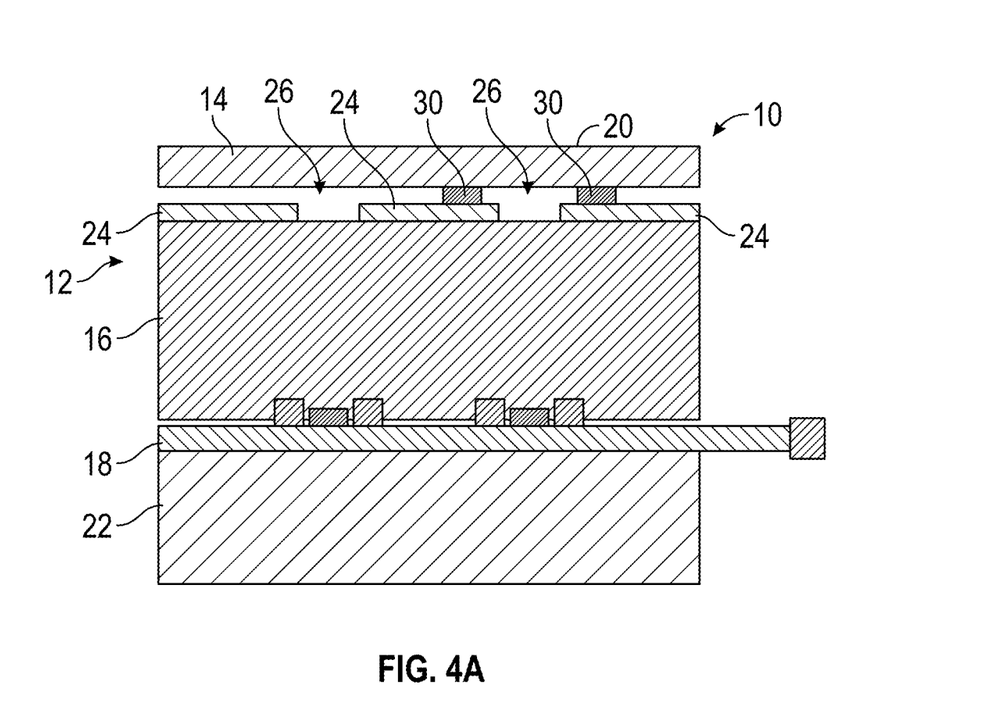
FIG. 4A is a cross-sectional view of a trim component in accordance with the present disclosure.

Referring now to FIG. 3 another embodiment of the present disclosure is provided. Here printed electronics 30 comprising switches such as capacitive sensor elements for controlling the printed electronics 28 for heating the outer show surface layer 14 are located between the masking layer 24 and the translucent layer 16. While it is states that the switches can control the printed electronics 28 for heating the outer show surface layer 14 as an alternative, the switches can control any other function of the vehicle including but not limited to seat position, climate control, autonomous driving features or whatever else is needed as an interface between human and machine. As illustrated, the printed electronics 30 are located behind or on top of (See FIG. 3A) the masking layer 24 and are not located in the gaps 26. As mentioned above and in one non-limiting embodiment, the light source 18 is a separate layer secured to the carrier layer 22. Alternatively, the light source 18 may be printed on the carrier layer 22 or be applied via a transfer foil Referring now to FIG. 4 another embodiment of the present disclosure is provided. Here only printed electronics 30 comprising switches such as capacitive switches for controlling other functions are located between the masking layer 24 and the translucent layer 16. As illustrated, the printed electronics 30 are located behind or on top of (See FIG. 4A) the masking layer 24 and are not located in the gaps 26. In this embodiment, no printed electronics 28 for heating the outer show surface layer 14 are provided. As mentioned above and in one non-limiting embodiment, the light source 18 is a separate layer secured to the carrier layer 22. Alternatively, the light source 18 may be printed on the carrier layer 22 or be applied via a transfer foil.

Figure 5:
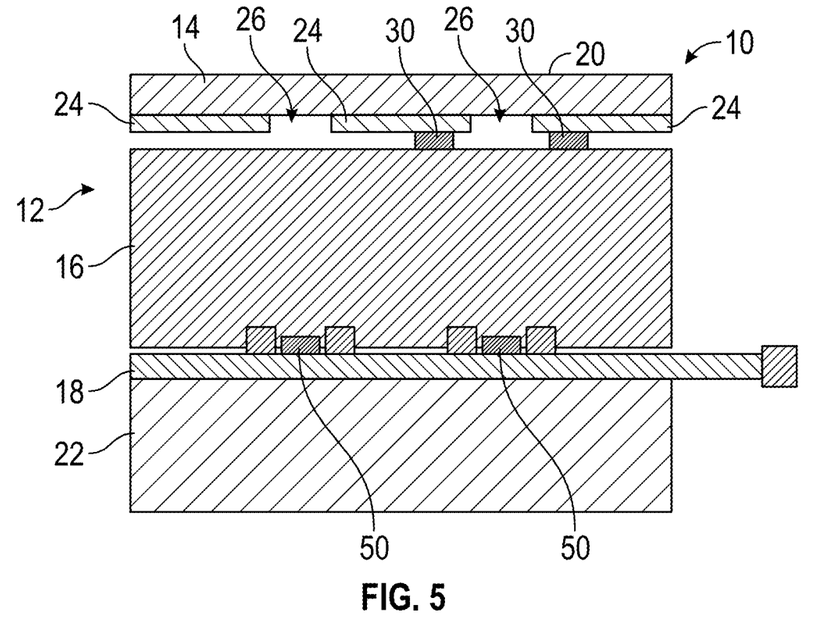
FIG. 5 is a cross-sectional view of a trim component in accordance with the present disclosure.
Figure 5A:
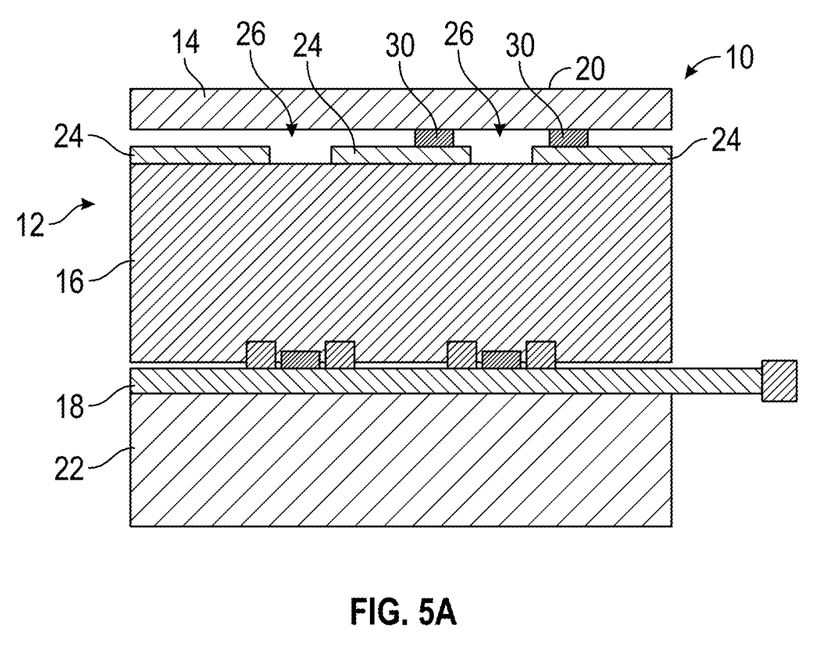
FIG. 5A is a cross-sectional view of a trim component in accordance with the present disclosure.

Referring now to FIGS. 5 and 5A another embodiment of the present disclosure is provided. Here mechanical snap dome switches, microswitches or any equivalent switches 50 may be located adjacent to or near the layer comprising the light source 18. Although the snap dome switches or microswitches 50 illustrated in FIGS. 5 and 5A are similar to the embodiments of FIGS. 4 and 4A. The snap dome switches or microswitches 50 may also be included in the embodiments illustrated in FIGS. 1-3A.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A trim element, comprising: a flexible layer;
   a carrier, the flexible layer being secured to the carrier, the flexible layer comprising an outer show surface layer, a translucent layer and a light source, the light source being secured to a side of the translucent layer that is opposite to a side of the translucent layer secured to the outer show surface layer, the outer show surface layer being translucent;
   a masking layer located between the outer show surface layer and the translucent layer, the masking layer having gaps where no masking layer is located between the outer show surface layer and the translucent layer; and
   switches, the switches being located between the masking layer and the translucent layer and wherein the switches are located behind or on top of the masking layer and are not located in the gaps.

2. The trim element as in claim 1, further comprising printed electronics for heating the outer show surface layer, the printed electronics being located between the masking layer and the translucent layer.

3. The trim element as in claim 2, wherein the printed electronics for heating the outer show surface layer are located behind or on top of the masking layer and are not located in the gaps.

4. The trim element as in claim 2, wherein at least some of the switches control the printed electronics for heating the outer show surface layer.

5. The trim element as in claim 1, wherein the switches are capacitive sensor elements.

6. The trim element as in claim 1, wherein the light source is a plurality of light emitting diodes (LEDs).

7. The trim element as in claim 1, wherein the translucent layer is a translucent foam.

8. The trim element as in claim 1, wherein the outer show surface layer is a skin formed from a thermoplastic polyolefin (TPO).

9. The trim element as in claim 1, wherein the light source is a plurality of light emitting diodes (LEDs), the translucent layer is a translucent foam, and the outer show surface layer is a skin formed from a thermoplastic polyolefin (TPO).

10. The trim element as in claim 4, wherein the light source is a plurality of light emitting diodes (LEDs), the translucent layer is a translucent foam, and the outer show surface layer is a skin formed from a thermoplastic polyolefin (TPO).

11. The trim element as in claim 1, further comprising microswitches or snap dome switches secured adjacent to the light source.

12. The trim element as in claim 1, wherein traces for the light source and contact pads are printed on the carrier or applied via transfer layer.

13. The trim element as in claim 1, wherein the outer show surface layer is a translucent skin formed from one of the following: a thermoplastic polyolefin (TPO), foil, artificial leather, leather or textile.

14. A method of forming a trim element, comprising: securing a flexible layer to a carrier, the flexible layer comprising an outer show surface layer, a translucent layer and a light source, the light source being secured to a side of the translucent layer that is opposite to a side of the translucent layer secured to the outer show surface layer, the outer show surface layer being translucent; and a masking layer being located between the outer show surface layer and the translucent layer, the masking layer having gaps where no masking layer is located between the outer show surface layer and the translucent layer; and switches, the switches being located between the masking layer and the translucent layer and wherein the switches are located behind or on top of the masking layer and are not located in the gaps.

15. The method as in claim 14, further comprising printed electronics for heating the outer show surface layer, the printed electronics being located between the masking layer and the translucent layer.

16. The method as in claim 15, wherein the printed electronics for heating the outer show surface layer are located behind or on top of the masking layer and are not located in the gaps.

17. The method as in claim 15, wherein at least some of the switches control the printed electronics for heating the outer show surface layer.

18. The method as in claim 14, wherein the outer show surface layer is a translucent skin formed from one of the following: a thermoplastic polyolefin (TPO), foil, artificial leather, leather or textile.

19. The method as in claim 14, wherein the switches are capacitive sensor elements.

20. A trim element, comprising: a flexible layer;
a carrier, the flexible layer being secured to the carrier, the flexible layer comprising an outer show surface layer, a translucent layer and a light source, the light source being secured to a side of the translucent layer that is opposite to a side of the translucent layer secured to the outer show surface layer, the outer show surface layer being translucent;
a masking layer located between the outer show surface layer and the translucent layer, the masking layer having gaps where no masking layer is located between the outer show surface layer and the translucent layer; and
wherein the outer show surface layer has a plurality of hidden icons that are only visible from an exterior show surface of the outer show surface layer when they are illuminated by the light source.

* * * * *